Figure 1:
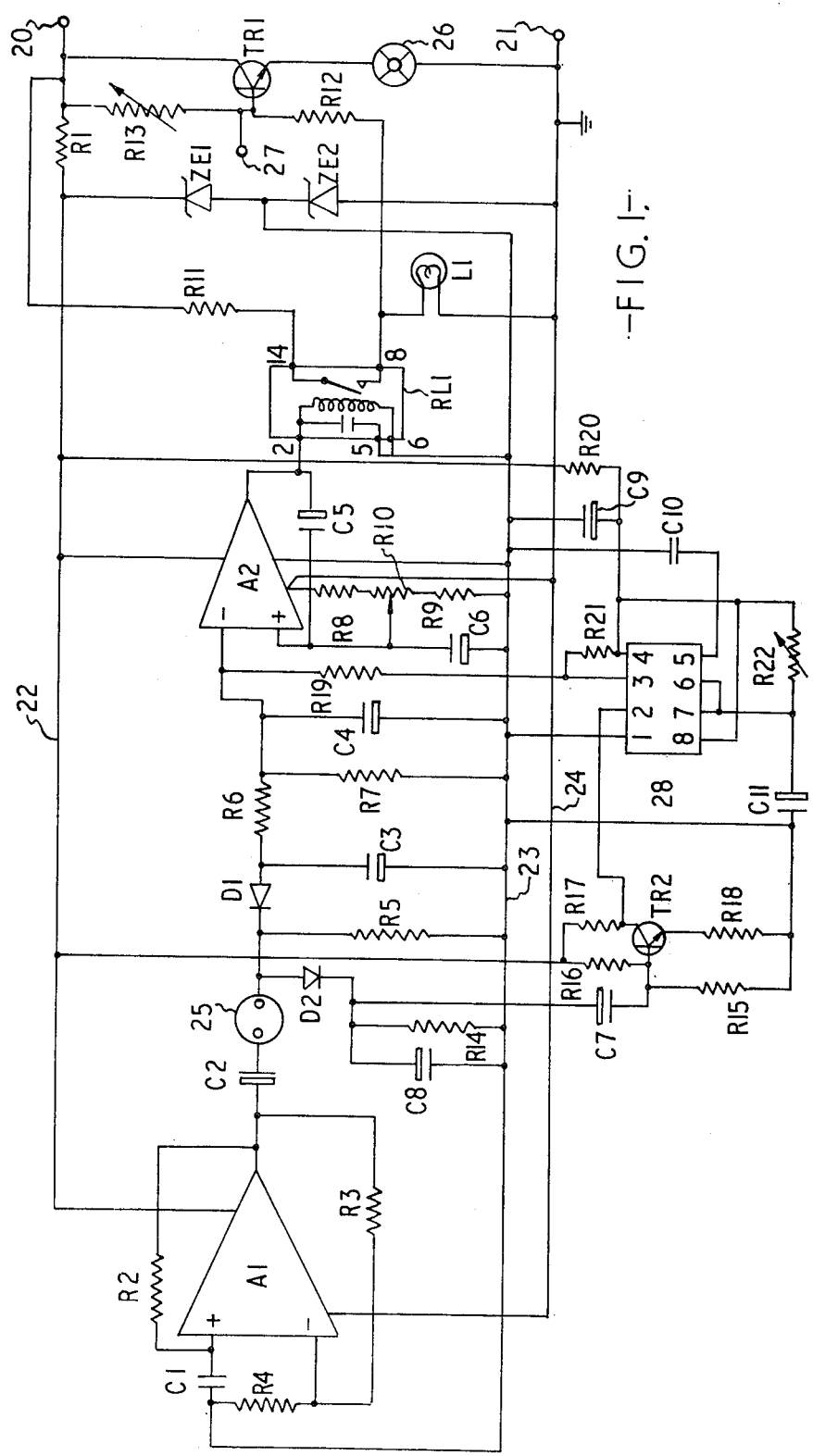

United States Patent [19]
Massie et al.

[11] 3,884,187
[45] May 20, 1975

[54] MASTITIS DETECTOR

[75] Inventors: Kenneth Herbert Massie; Gordon Alfred Chalton, both of Bromborough, England

[73] Assignee: Chalton Electronic Services Limited, Flintshires, North Wales, Great Britain

[22] Filed: Sept. 21, 1973

[21] Appl. No.: 399,613

[52] U.S. Cl............................ 119/14.14; 119/14.15
[51] Int. Cl. ................................................ A01j 7/00
[58] Field of Search........... 119/14.14, 14.15, 14.16, 119/14.08

[56] References Cited
UNITED STATES PATENTS

| | | | |
|---|---|---|---|
| 2,898,549 | 8/1959 | Miller | 119/14.15 X |
| 3,474,330 | 10/1969 | Dauphinee | 139/309 |
| 3,566,841 | 3/1971 | Gerrish et al. | 119/14.15 |
| 3,664,306 | 5/1972 | Quayle et al. | 119/14.14 |
| 3,695,230 | 10/1972 | Quayle et al. | 119/14.14 |

*Primary Examiner*—Hugh R. Chamblee
*Attorney Agent, or Firm*—Scrivener Parker Scrivener & Clarke

EXEMPLARY CLAIM

17. Apparatus according to claim 14 in which a lower one of said ports has a tubular extension into the interior of said cell, the outer wall of the tubular extension and a portion of the inner wall of the spherical wall defining an annular well, said electrodes having ends spaced apart within said well and said tubular extension having a duct therethrough connecting said well to said one port.

17 Claims, 2 Drawing Figures

MASTITIS DETECTOR

The invention relates to the detection of subclinical mastitis in milking cows.

Mastitis is a disease of the udder, which is estimated to cause serious losses of milk production.

Devices which detect the mastitis condition are known from British Patent Specifications Nos. 1,086,665 and 1,194,329. They operate by measuring the electrical conductivity of the cow's milk, the conductivity increasing with increasing degrees of infection. The device shown in British Patent Specification No. 1,086,665 comprises a conductivity cell having two electrodes with milk flowing therebetween, the conductivity being measured on a meter. In British Patent Specification No. 1,194,329 the conductivity is measured using an electrical bridge circuit. However it has been found that the fore milk from some uninfected cows sometimes has a relatively high conductivity and it is desirable that mastitis detecting devices should not respond to such conditions.

According to the present invention, there is provided milk conductivity indicating apparatus comprising a conductivity cell having two electrodes between which the milk from the cow may pass during milking, means for supplying electric current to said cell to be attenuated therein according to the milk conductivity, a trigger circuit responsive to the attenuation of said current so as to fire when the milk conductivity exceeds a predetermined value, indicating means for visibly and/or audibly indicating firing of said trigger circuit, and a circuit for preventing activation of the trigger means in response to signals indicative of the conductivity of the fore milk passing through the cell.

Preferably the electric current supplying means comprises a multivibrator whose output pulses are differentiated by a capacitor and the resulting positive and negative voltage peaks are attenuated in the conductivity cell. The attenuated voltage peaks of polarity are passed by a diode to a capacitor which can be thereby charged to a voltage dependent upon milk conductivity.

Advantageously the trigger circuit comprises a Schmitt trigger having two inputs of which one is connected to the last-mentioned capacitor and the other is connected to a reference potentiometer.

Conveniently the input to the delay circuit is connected via a separate diode to the output of the cell so that the delay circuit is triggered immediately the cell commences to conduct. The output from the delay circuit is connected to the input of the schmitt trigger preventing it from being fired during the initial milking period.

Preferably, the conductivity cell is manufactured from polycarbonate and is in the form of a sphere having a smooth finish to the interior, the shape and construction substantially avoiding restriction to milk flow therethrough and to retained contaminents for future milk. This substantially reduces the lodging and growth of bacteria in the interior of the cell.

The cell may be situated at the inlet to a measuring jar and be directly coupled in the milk flow line. In this position the whole looped box unit, that is the conductivity cell and the electrical circuit, do not interfere with the original milking function, and is not easily damaged as it is well away from actual moving parts of the milking system.

The electrodes can be manufactured from high purity hard graphite, each protruding slightly into the conductivity cell wall.

The present apparatus enables the indiciation of a probable mastitic condition in the sub-clinical stage and has the added advantages in the simplicity with which the condition may be indicated.

Figure 2:
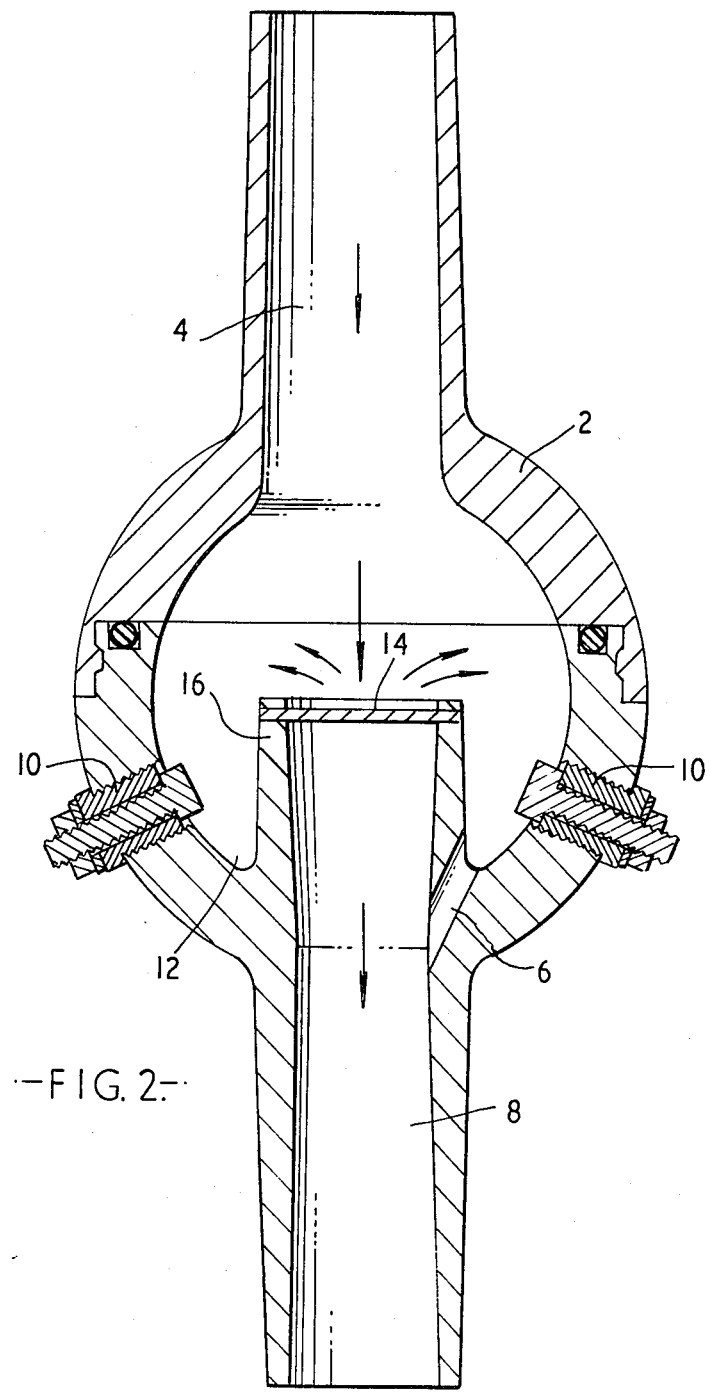

The invention is further described, by way of example, with reference to the accompanying drawings, in which:

FIG. 1 is a circuit diagram of an electronic conductivity indicating apparatus in accordance with the invention, and FIG. 2 is a longitudinal sectional view of a milk conductivity cell of the device.

Referring to FIG. 1, power for the milk conductivity indicating apparatus is provided by a normal 28v D.C. applied to a positive terminal 20 and an earthed negative terminal 21. A series circuit of a resistor R1 of 220 Ohms and zener diodes ZE1 and ZE2 of types BZX61/C 12 and BZY88/C 5VS is connected between the terminals 20 and 21 to provide stabilized operating potentials of +12v and −5.6v on a positive lead 22 and on a common lead 23 relative to an earth lead 24 connected to the terminal 21. The D.C. may be obtained from an a.c. mains outlet via a power pack comprising a stepdown transformer and a bridge rectifier having a smoothing capacitor connected across its output.

Respective terminals of a first operational amplifier A1 are connected to the positive lead 22 and the earth lead 24. The operational amplifier A1 may be an integrated circuit of the type commercially available under the designation 741 OPA. It is operated as a multivibrator and to this end its output is connected via a resistor R2 of 4:7kΩ to its non-inverting input and via a resistor R3 of 1:2kΩ to its inverting input and its non-inverting and inverting inputs are connected respectively via a capacitor C1 of 0.1μF and a resistor R4 of 1.2KΩ to the common lead 23. The frequency of the multivibrator is determined substantially by the resistor R4 and the capacitor C1 and is about 1kH$_z$. The mark-to-space ratio is determined substantially by the resistors R2 and R3 and is about 2:1. The output of the multivibrator is thus a pulsed direct current of constant amplitude with about 8v peak.

The output of the multivibrator is applied via a capacitor C2 of 47μF to one electrode of a conductivity cell 25 whose other electrode is connected via a resistor R5 to the common lead 23. Pulses from the multivibrator are attenuated by the conductivity cell in accordance with the conductivity between its electrodes. The attenuated voltage peaks appear across the resistor R5.

A diode D1 passes the negative voltage peaks (i.e., negative with respect to the common lead 23) appearing across the resistor R5 via a smoothing circuit, comprising a capacitor C3 of 47μF. A series resistor R6 of 470 Ohms and a parallel resistor R7 of 620 Ohms, a capacitor C4 of 100 μF limit the input to a second operational amplifier A2 to approximately −1 volt.

The second operational amplifier A2 has terminals connected to the positive, common and earth leads 22, 23 and 24. The operational amplifier A2 may be an integrated circuit of the type commercially available under the designation 710 OPA. It is operated as a Schmitt Trigger. Its output is connected by a feedback capacitor C5 of 100μF to its non-inverting input which is also connected to the tapping of a voltage divider connected between the common lead 23 and the earth lead 24 and comprising resistors R8 and R9 and a potentiometer R10 of 47KΩ, 1K and 470 Ohms, respectively. A decoupling capacitor C6 of 10μF is connected between the potentiometer tapping and the common lead 23. One plate of the capacitor C4 is connected to the inverting input of the operational amplifier A2, its other plate being connected to the common lead 23. The setting of the potentiometer R10 determines the trigger voltage of the Schmitt trigger. The Schmitt trigger is fired as soon as the voltage on the capacitor C4 becomes more negative (with respect to the common lead 23) than the voltage on the tapping of the potentiometer R10. The Schmitt trigger then behaves as a voltage dependent oscillator or monostable multivibrator by virtue of the positive feedback capacitor C5, the frequency of the oscillator depending upon the extent by which the voltage on the capacitor C4 is more negative than the voltage on the potentiometer tapping.

The output of the Schmitt trigger is connected to a terminal 2 of a reed relay RL1, terminals 5 and 6 of the reed relay RL1 being connected to the common lead 23 and terminal 8 of the reed relay RL1 being connected via a resistor R12 of 10K to the base of an amplifying transistor TR1 of npn type (BC108). The terminal 14 of the reed relay RL1 is connected via a resistor R11 to the lead 20, the terminal 8 is connected to one contact of a bulb L1 and the other contact of the bulb L1 is connected to the lead 21. The collector of the transistor TR1 is connected to the positive lead 22 and its emitter is connected to an alarm bell 26 which is connected to lead 24. A 47KΩ variable resistor R13 is connected between the base of the transistor TR1 and the positive lead 22 and serves to adjust the sensitivity of the bell circuit. The resistor R12 serves as a buffer resistor enabling the bell circuit to be common to several conductivity indicating apparatus, each of which is connected via its respective decoupling resistor R12 to the base terminal 27 of the transistor TR1. An an alternative to a reed relay RL1 the amplifier A2 can be used to power a light emitting diode (not shown). But the reed relay is especially advantageous as in the embodiment shown in FIG. 1 where it is desired to use high wattage audible or visual warning devices.

A delay circuit is provided to prevent the build up of charge on the capacitor C4 for a predetermined response delay. The delay circuit is triggered by the first positive voltage pulse conducted by the conductivity cell. This positive pulse is passed by a diode D2 and a 47μF capacitor C7 to the base of an npn transistor TR2. A 10μF capacitor C8 and a 10K resistor R14 smooth the output of the diode D2 with respect to the common lead 23. The base of the transistor TR2 is connected via a 10K resistor R15 to the common lead 23 and via a 100K resistor R16 to the positive lead 22. The collector is connected via a 10K resistor R17 to the positive lead 22 and the emitter is connected via a 1K resistor R18 to the common lead 23.

The relay circuit includes a timer 28 which may be of the kind commercially available from the English firm Timer Signetics Limited under the designation NE555. Terminal No. 1 of the timer 28 is connected to the common lead 23. The collector of the transistor TR2 is connected to the input terminal 2. The output terminal 3 is connected via a resistor R19 of 10K to the capacitor C4. Interconnected terminals 4 and 8 are connected via a resistor R20 of 1K to the positive lead 22, via a decoupling capacitor C9 of 47μF to the common lead 23 and via a resistor R21 of 10K to terminal 3. Terminal 5 is connected via a capacitor C10 of 0.1μF to the common lead 23. Interconnected terminals 6 and 7 are connected via a capacitor C11 of 1,000μF to the common lead 23 and via a variable resistor R22 of 100K to terminals 4 and 8.

Immediately the delay circuit is triggered it prevents the potential at the inverting input of amplifier A2 firing the Schmitt trigger whatever the conductivity of the cell 25. The capacitor 11 is slowly charged via the variable resistor R22 until the set delay time has elapsed whereupon the delay circuit is released, thereby allowing the charge to build up on the capacitor C4 and to fire the Schmitt trigger if the conductivity of the cell 25 is sufficiently high. The delay time is set by adjustment of the resistor R22 and a delay of up to 5 minutes is available if required.

FIG. 2 shows a milk conductivity cell 25 which is manufactured from polycarbonate. The wall 2 of the cell is generally spherical and has a smooth finish to the interior, the shape and construction substantially avoiding restriction to milk flow therethrough and to retained contaminants for future milking.

The cell is situated at the inlet to a measuring jar (not shown) directly coupled in the milk flow line from the teat cup cluster of a milking machine.

A port 8 of the cell has a cylindrical extension 16 which extends inwardly towards the interior of the cell so defining an annular well 12 between the outside wall face of the extension 16 and a portion of the inside wall face of the cell.

Two electrodes 10 are manufactured from high purity hard graphite, each electrode being one-fourth inch in diameter and protruding into the well 12 through the conductivity cell wall 2 by one-eighth inch. The terminals of the electrodes are exterior to the cell wall and comprise a stainless screw inserted into the graphite.

During a milking period the milk enters the conductivity cell via the port 8 and leaves the cell via a port 4. Splash back fills the well 12 with a sample of the milk between the electrodes 10 can then be measured. A drain opening 6 serves to drain back to the port 8 the milk sample which has accumulated in the well 12. Thus, the cell is cleared of milk so that it is ready to test the next milk sample. This process is repeated at a frequency determined by the frequency of the vacuum pulsations at which the milking machine operates.

The cell can alternatively be arranged so that the milk flows through the cell in the opposite direction to that described above. Thus, the milk enters the conductivity cell via the port 4 and leaves via the port 8. Splash back of the milk is created by an adapter bar 14 which is fitted across the end of the extension 16. The splash back causes the filling of the well 12 and enables sampling to take place. The milk sample accumulated in the well 12 drains through the drain opening 6.

To simplify manufacture of the cell, the electrodes 10 may be arranged to enter the cell wall 2 through suitable bosses in directions parallel to the longitudinal axis rather than radially as illustrated.

The shape of the cell and the materials from which it is manufactured enable the cell to be kept in a high state of cleanliness and to be sterilized regularly.

Before milking commences the conductivity of the cell 25 is infinite as it contains no milk. No charge can build up on the capacitor C4 and the delay circuit is not triggered. Tests carried out on individually milked cows have shown that in some cases high conductivity could be observed in the fore milk of healthy cows. Thus, immediately the first milk reaches the conductivity cell 25, the delay circuit is triggered to prevent the Schmitt trigger from being fired even if the conductivity of the milk is higher than normal. After the set delay time, which is preferably about 1 minute, the delay circuit is released to permit a charge to build up on the capacitor C4 to a voltage dependent upon the conductivity of the milk now flowing through the cell. Any high conductivity fore milk will have passed so that the negative voltage on the capacitor C4 is insufficient to fire the Schmitt trigger assuming that the milk is from a healthy cow.

However, in the event that the conductivity of the milk following the fore milk is higher than normal, a sympton of sub-clinical mastitis, the negative charge on the capacitor C4 builds up over a period of a few seconds to a voltage higher than the negative voltage on the tapping of the potentiometer R10 and the Schmitt trigger is fired. The capacitor C5 holds the Schmitt trigger in its fired state for a short lapse of time to enable the flash of illumination from the light L1 to be perceived. Whilst the milk conductivity remains high the light continues to flash. The frequency of the flashes becomes the greater, the higher is the conductivity of the milk so that the frequency can be used to roughly judge the conductivity. At the same time the alarm bell 26 rings to draw attention to the presence of high milk conductivity. Inasmuch as the alarm bell 26 may be common to several conductivity indicating apparatus when milking several cows simultaneously, the appropriate flashing light has to be observed in order to determined which cow is yielding the high conductivity milk.

The delay in charging the capacitor C4 and also the presence of the capacitor C3 prevent spurious signals and signal fluctuations from undesirably firing the Schmitt trigger.

We claim:

1. Milk conductivity indicating apparatus comprising a conductivity cell having two electrodes between which the milk is adapted to be passed during milking, means for supplying electric current to said cell, said current being attenuated in said cell to a greater or lesser extent according to the lesser or greater conductivity of the milk between said electrodes, trigger means responsive to the attenuation of said current so as to fire when the milk conductivity exceeds a predetermined value, indicating means for indicating response of said trigger means, and a curcuit for preventing activation of the trigger means in response to signals indicative of the conductivity of the fore milk passing through the cell.

2. Apparatus according to claim 1 in which said electric current supplying means comprises a multivibrator for producing current pulses.

3. Apparatus according to claim 2 which includes a differentiating capacitor connected between the multivibrator and the conductivity cell.

4. Apparatus according to claim 3 which includes a resistor connected in series with the conductivity cell.

5. Apparatus according to claim 3 which includes a conductivity responsive capacitor and a diode connecting the last-mentioned capacitor to said conductivity cell whereby the last-mentioned capacitor can charge up to a voltage dependent upon the conductivity of the cell.

6. Apparatus according to claim 2 in which said trigger means comprises a Schmitt trigger for comparing a voltage dependent upon the conductivity of the cell with a reference voltage.

7. Apparatus according to claim 6 in which the Schmitt trigger is adapted to oscillate, when fixed, at a frequency dependent upon the amount by which the conductivity dependent voltage exceeds the reference voltage.

8. Apparatus according to claim 6 in which said delay circuit means has an input connected to said conductivity cell so as to be triggered immediately said cell commences to conduct and has an output connected to the input of the Schmitt trigger to suppress said conductivity dependent voltage for said predetermined initial period.

9. Apparatus according to claim 3 in which said delay circuit means has its input connected via a diode to said conductivity cell so as to be triggered immediately said cell commences to conduct and has its output connected to the input of said trigger means to prevent the latter from responding for said predetermined initial period.

10. Apparatus according to claim 1 in which the delay period of said delay circuit means is about one minute.

11. Apparatus according to claim 1 in which said indicating means comprises a light emitting device.

12. Apparatus according to claim 1 in which said indicating means comprises an audible alarm.

13. Apparatus as claimed in claim 1 in which the output of the trigger circuit is used to actuate a reed relay for connecting the indicating means to the power supply circuit of the apparatus.

14. Apparatus according to claim 1 in which said conductivity cell comprises a casing defined by a generally spherical wall with diametrically opposed inlet and outlet ports and two electrodes disposed in said wall.

15. Apparatus according to claim 14 in which said cell wall is made from polycarbonate.

16. Apparatus according to claim 14 in which said electrodes are made from graphite.

17. Apparatus according to claim 14 in which a lower one of said ports has a tubular extension into the interior of said cell, the outer wall of the tubular extension and a portion of the inner wall of the spherical wall defining an annular well, said electrodes having ends spaced apart within said well and said tubular extension having a duct therethrough connecting said well to said one port.

* * * * *